United States Patent [19]
Jones et al.

[11] Patent Number: 6,067,286
[45] Date of Patent: May 23, 2000

[54] DATA NETWORK SWITCH WITH FAULT TOLERANCE

[75] Inventors: Trevor Jones; Richard Barnett, both of Maldon, United Kingdom

[73] Assignee: General DataComm, Inc., Middlebury, Conn.

[21] Appl. No.: 08/930,973

[22] PCT Filed: Apr. 9, 1996

[86] PCT No.: PCT/US96/05029

§ 371 Date: Oct. 7, 1997

§ 102(e) Date: Oct. 7, 1997

[87] PCT Pub. No.: WO96/32790

PCT Pub. Date: Oct. 17, 1996

[30] Foreign Application Priority Data

Apr. 11, 1995 [GB] United Kingdom ................... 9507454

[51] Int. Cl.[7] .................................................. H04L 12/26
[52] U.S. Cl. ......................... 370/218; 370/244; 370/248
[58] Field of Search ..................................... 370/216, 217, 370/218, 219, 220, 221, 222, 225, 227, 228, 242, 244, 248, 250, 251, 360, 386, 387, 388, 395, 410

[56] References Cited

U.S. PATENT DOCUMENTS

| | | | |
|---|---|---|---|
| 5,179,552 | 1/1993 | Chao | 370/389 |
| 5,485,453 | 1/1996 | Wahlman et al. | 370/217 |
| 5,550,815 | 8/1996 | Cloonan et al. | 370/396 |
| 5,574,718 | 11/1996 | Eckhoff et al. | 370/228 |
| 5,724,352 | 3/1998 | Cloonan et al. | 370/395 |
| 5,740,157 | 4/1998 | Demiray et al. | 370/219 |

*Primary Examiner*—Chi H. Pham
*Assistant Examiner*—Kwang B. Yao
*Attorney, Agent, or Firm*—David P. Gordon; David S. Jacobson; Thomas A. Gallagher

[57] ABSTRACT

An ATM data network switch having two separate but simultaneously active switch fabrics and a plurality of slot controllers is disclosed. Each slot controller has at least one external data link thereto and is separately connected to the two separate switch fabrics. Each switch fabric was the ability to switch a data cell transmitted from any one of the slot controllers to any of the other slot controllers. Each slot controller is arranged to determine the availability of the data paths to all the other slot controllers through both switch fabrics and to select for each cell to be switched a data path through one or the other of the switch fabric according to the availability determined.

20 Claims, 5 Drawing Sheets

| | UPPER | | | LOWER | |
|---|---|---|---|---|---|
| | RETURN CODE | SOURCE SLOT | PRI | 0x3F | XY |
| 0 | RETURN CODE | SOURCE SLOT | PRI | 0x3F | XY |
| 1 | UNDEFINED | | 0xFF | | |
| 2 | UNDEFINED | | 0xFF | | |
| 3 | N | | N+1 | | |
| 4 | N+2 | | N+3 | | |
| 5 | N+4 | | N+5 | | |
| 26 | N+46 | | N+47 | | |
| 27 | N+48 | | N+49 | | |
| 28 | N+50 | | N+51 | | |
| 29 | N+52 | | CHECKSUM | | |

FIG. 5

| | UPPER | | | LOWER | |
|---|---|---|---|---|---|
| 0 | RETURN CODE | RETURNING SLOT | PRI | 0x3F | XY |
| 1 | UNDEFINED | | DESTINATION SLOT BITMASK | | |
| 2 | UNDEFINED | | DESTINATION SLOT BITMASK | | |
| 3 | N | | N+1 | | |
| 4 | N+2 | | N+3 | | |
| 5 | N+4 | | N+5 | | |
| 26 | N+46 | | N+47 | | |
| 27 | N+48 | | N+49 | | |
| 28 | N+50 | | N+51 | | |
| 29 | N+52 | | CHECKSUM | | |

DATA NETWORK SWITCH WITH FAULT TOLERANCE

BACKGROUND OF THE INVENTION

1. Field of the Invention

This invention relates to an Asynchronous Transfer Mode (ATM) data network switch for use in switching cells of data between a plurality of data links. The switch is arranged to have a high degree of tolerance to faults.

2. State of the Art

An ATM switch comprises, in general terms, a cross-point switch having a plurality of input ports and a plurality of output ports, and one or more controllers for switching data cells from any input port to any output port. The controllers which switch the data cells (which are often called "slot controllers" or "link controllers") each typically comprise input controllers or receivers, whose principal function is simply to receive the bit stream from the external link and to divide it up into cells for presentation to the switch fabric, and output controllers or transmitters, which serve to convert the separate cells from the switch fabric into a continuous bit stream again for forwarding on an appropriate external link.

Since a fault in the switch fabric could cause failure of the complete switch, duplicate switch fabrics connected in parallel to the slot controllers are used. If a fault is detected in one switch fabric, switching is transferred to the second switch fabric, while the first is removed from use. It is possible to designate one of the slot controllers as a system controller arranged to monitor operation of the switch. For example, the system controller can send out "health check" cells to each other controller, to which the other slot controllers are arranged to respond by returning the cell to the system controller, which monitors the responses received. If the system controller does not receive all responses, this may be due to a fault in the switch fabric, and the system controller then switches from the first to the second switch fabric. This can result in a cell loss.

A further problem with such an arrangement is that, although the switch fabric is fully duplicated, the second switch fabric remains inactive until it is required. It is therefore not possible to guarantee that the second switch fabric is fully operational when needed, since it can only be tested when in use. Further, no other advantage of duplication of switch fabrics is obtained. The capacity of the switch is identical with that of a switch having only a single switch fabric.

SUMMARY OF THE INVENTION

It is therefore an object of the invention to provide a flexible ATM data network switch which permits increased throughput and decreases the chance of cell loss.

It is another object of the invention to provide an ATM data network switch having dual switch fabrics with means for monitoring the status of all paths through the switch fabrics.

In accordance with the objects of the invention, there is provided an ATM data network switch having two separate switch fabrics, and at least one switching controller, each switching controller (hereinafter referred to as "slot controller") having a plurality of external data links thereto and being separately connected to the two separate switch fabrics. Each switch fabric in turn comprises means for switching a data cell transmitted from any one of the slot controllers to any of the other slot controllers. According to the invention, both of the switch fabrics are arranged to be active at the same time and each slot controller comprises means for determining the availability of the data paths to all the other slot controllers through both switch fabrics and for selecting for each cell to be switched a data path through one or other of the switch fabrics according to the availability determined.

According to a preferred aspect of the invention, each slot controllers may comprise two or more cell processors, each connected to at least one external data link, and means for connecting each of the cell processors to each of the switch fabrics, thereby facilitating the handling of larger numbers of external links. The use of separate cell processors is a convenient way of increasing capacity in a slot controller; but it will be appreciated that by appropriate design of the cell processor, greater numbers of external connection and internal switching paths may be provided for without the need for division into separate processors acting in parallel.

Preferably, each slot controller comprises means for periodically sending to each other slot controller via each switch fabric a "health check" data cell, means for receiving health check cells from other slot controllers and for returning each cell to its source via the same data path, and means for monitoring the return of health check cells from other slot controllers and for identifying therefrom the availability of individual data paths through each of the switch fabrics. The health check system establishes which paths are operating correctly.

Although the primary reason for providing two or more paths between each slot controller and each other slot controller is fault tolerance, in accord with the invention, it will be seen that if full fault tolerance is not required it is also possible to use two paths simultaneously to achieve, for example, 1.6 Gbps throughput per slot rather than 800 Mbps for a single path. Also, if desired, different data transit priorities may be assigned to the two paths, so that high priority data cells can pass through one path with minimal transit delay, while the bulk of the date cells, which are of lower priority and can tolerate greater transit delays, can pass through the other path.

Thus, in the dual redundant mode, there are two paths between each pair of slot controllers, through the two separate switch fabrics. A switch may, for example, support four classes of cell traffic, in descending order or priority: (1) CBR—Constant Bit Rate; (2) VBR—Variable Bit Rate; (3) ABR—Available Bit Rate; and (4) UBR—Unspecified Bit Rate; and each of these may have associated with it a switch fabric preference. For example, all traffic classes apart from CBR might be assigned a preference for the first or A path, while CBR cells are given a preference for the second or B path. As long as the B path to the target slot controller is available for a particular CBR cell, it will use the B path, but if that path is unavailable, the control means in the source slot controller will automatically route the cell over the A path. Similarly, the other classes will re-route through the B path should the A path fail to a particular slot controller. The decision is made separately for each target slot controller from any particular source slot controller. Provided the total sustained rate is within the raw 800 Mbps capacity (for example) of a single switch fabric path, the slot controller will continue to operate at full load to any target slot controller provided at least one of the two paths is operating. Should both fail, the source slot controller is arranged to discard cells intended for the target slot controller.

One option in redundant mode would be to send, say, cells of priorities 1 and 3 through one switch fabric and those of priorities 2 and 4 through the other switch fabric, each switch fabric operating at a maximum of half of its maximum capacity, and therefore providing the possibility of re-routing cells through the other switch fabric should a path fail in the first, without the risk of exceeding the capacity of the switch to handle the total loading of all four priorities of cells.

In the double capacity mode, for example of 1.6 Gbps per slot, the full raw bandwidth of both switch fabric interfaces is available, although a single Virtual Connection (VC) is still limited to the through put of one switch fabric interface in order to avoid re-sequencing cells. Should an inter-slot controller path fail, available throughput will halve between those two slot controllers as all of the cells have to be moved on to the same switch fabric interface. This is, of course, a considerable improvement on the conventional arrangement where only one switch fabric is provided, or on the conventional redundant configuration, where the second switch fabric has to be switched in to replace the first, with resultant loss of throughput at the time of the switch over. It will be appreciated that this mode of operation is really an issue of VC configuration rather than one of hardware, and therefore slot controllers within the same switch can operate in different modes according to demand.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
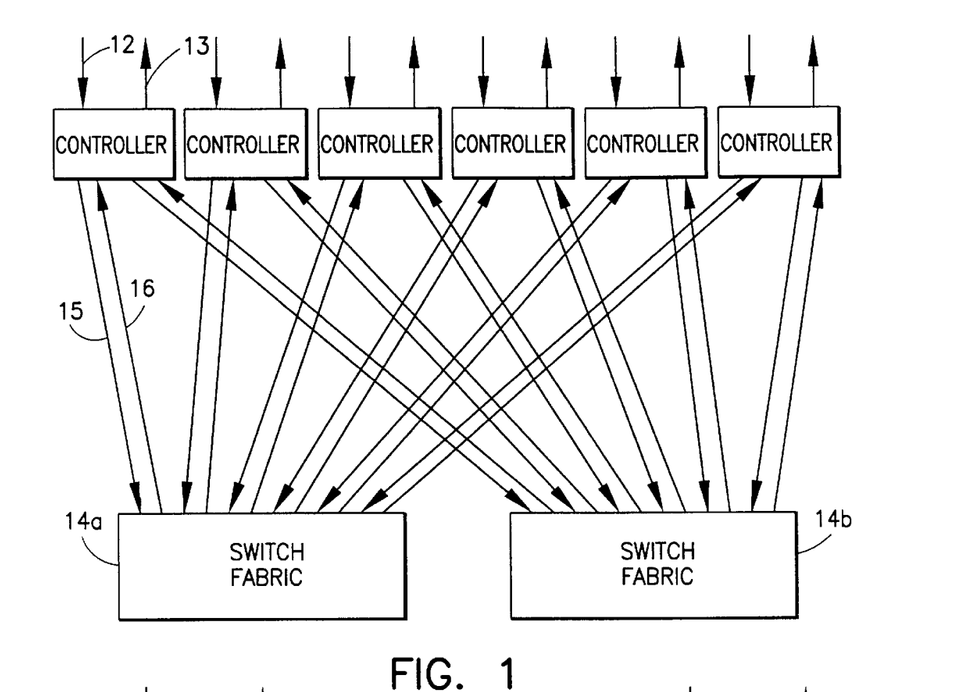
FIG. 1 shows the connections of the individual slot controllers to two switch fabrics in a simple switch according to the invention.

Referring to FIG. 1, the simple arrangement illustrated has six slot controllers 11a–f, each having external input and output links 12 and 13 respectively, and two separate switch fabrics 14a and 14b, each of a dynamic crosspoint type and having input and output connections 15 and 16 respectively to each of the slot controllers 11. The structure of the slot controllers is, for example, of the general type described and claimed in co-owned application GB 9505358.3, which is hereby incorporated by reference herein in its entirety, and ATM cells arriving on an input link 12 may be processed in the general manner described in that application. Each slot controller comprises means for generating health check cells as hereinafter described, and for broadcasting the health check request cells to each other slot controller via both switch fabrics 14a, 14b. In contrast to the previous arrangements in the art in which redundancy is provided and where one switch is maintained as active and the other is maintained as inactive until a failure in the first switch causes the second switch to be activated, in the arrangement of the present invention both switch fabrics are maintained simultaneously active. As will be described in more detail below, upon receipt of a health check request cell in a slot controller, a health check reply cell is generated and transmitted back to the source of the original request cell via the same data path. In this way, the originating slot controller receives reply cells from all the other slot controllers over the active data paths through the two switch fabrics, and can thereby determine the availability to itself of all the possible data paths in the switch. Each slot controller comprises memory in which the availability data can be stored so that each cell arriving at the slot controller from an external link can be routed within the switch according to the availability stored therein. For example, if in slot controller 11a the data path to slot controller 11d through switch fabric 14a is flagged as unavailable in the slot controller memory, then a cell whose destination within the switch is controller 11d will be routed through the other switch fabric 14b.

Figure 2:
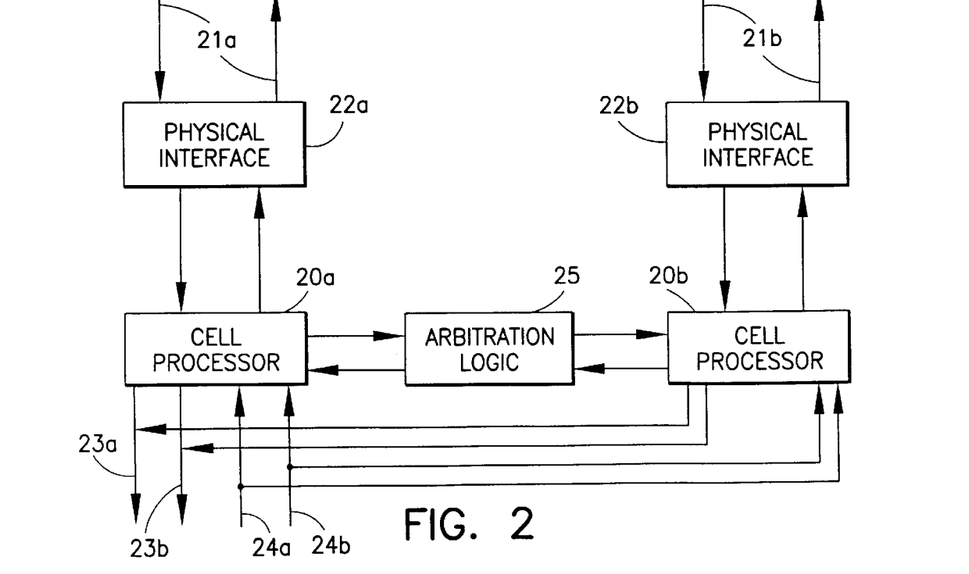
FIG. 2 shows an individual slot controller of FIG. 1 in more detail.

Referring to FIG. 2, each slot controller may optionally comprise two cell processors 20a and 20b, each in the form of an ASIC and having associated RAM defining input and output buffers. The cell processors also preferably provide buffer management functions, to support, e.g., two 622.08 Mbps links 21a and 21b, or up to sixteen links at lower speeds, via physical interfaces 22a and 22b. The preferred slot controller of the invention has two output connections 23 and 23b to the two switch fabrics 14a and 14b respectively, and two input connections 24a and 24b for cells returning from the two switch fabrics. An arbitration logic 25 controls the output from each cell processor 20 to the respective switch fabrics and input to the cell processors from the switch fabrics. When a cell processor 20 wishes to send a cell to one or other of the switch fabrics, a request is sent by the cell processor to the arbitration logic 25. The mechanism by which the request is generated is described hereinafter with reference to FIG. 9. The arbitration logic is arranged to simply to ensure that both cell processors are not sending cells to the same switch fabric at the same time. This is done by sending a grant signal back to the processor to permit it to send its cell. The processor cannot proceed until it has received the grant, and the grant is decided on the basis of alternation between the two cell processors when there is a conflict for the same switch fabric at the same time; in such an event, one of the cell processors has to wait to transmit its cell until the other has sent its cell.

Figure 3:
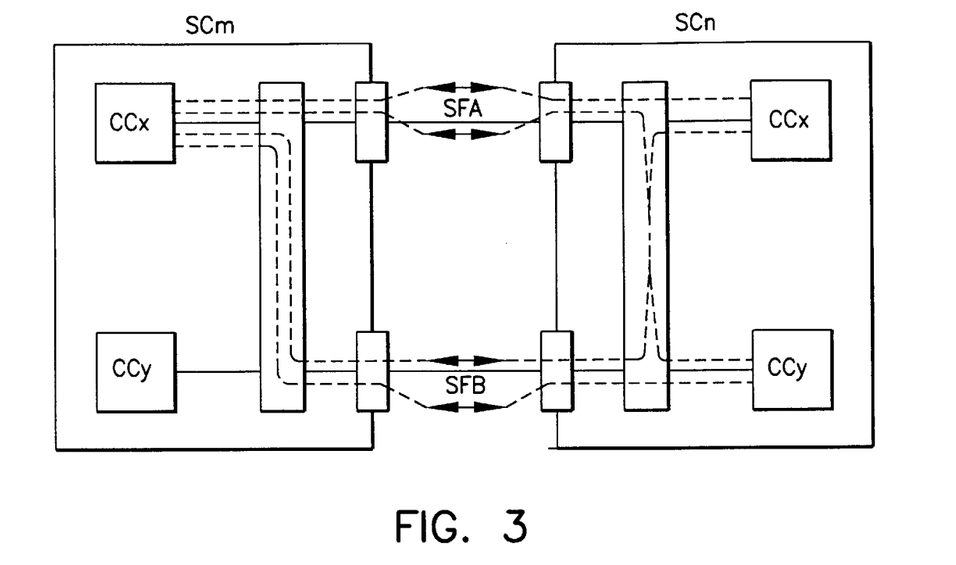
FIGS. 3 and 4 show possible data paths for a switch in which the slot controllers comprise a plurality of individual cell processors.
Figure 4:
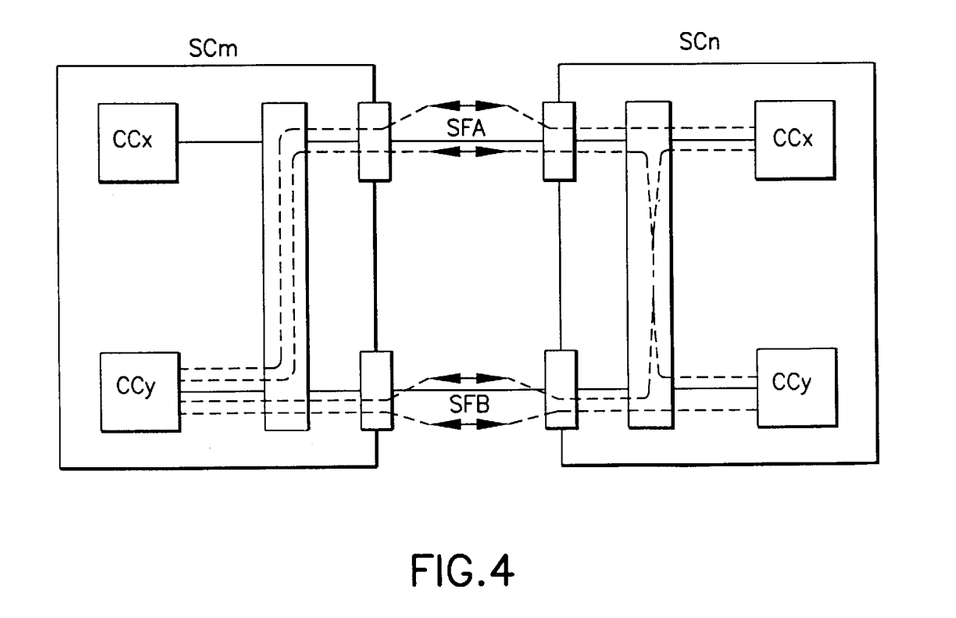

FIGS. 3 and 4 illustrate the different paths between two separate slot controllers. With two cell processors in each slot controller and two switch fabrics, the number of paths which are available and which need to be checked is increased to eight, as follows:

Slot controller SCm, cell processor CCx via SFA to slot controller SCn, cell processor CCx;

Slot controller SCm, cell processor CCx via SFB to slot controller SCn, cell processor CCx;

Slot controller SCm, cell processor CCx via SFA to slot controller SCn, cell processor CCy;

Slot controller SCm, cell processor CCx via SFB to slot controller SCn, cell processor CCy;

Slot controller SCm, cell processor CCy via SFA to slot controller SCn, cell processor CCx;

Slot controller SCm, cell processor CCy via SFB to slot controller SCn, cell processor CCx;

Slot controller SCm, cell processor CCy via SFA to slot controller SCn, cell processor CCy;

Slot controller SCm, cell processor CCy via SFB to slot controller SCn, cell processor CCy.

In addition, the switch fabrics may be arranged to handle cells of different priority in different ways, effectively creating a further diversification of paths. For example, in the crosspoint switch fabric used by the switch in accordance with the illustrated embodiments, the switching is carried out using ASICs which are configured to allow a cell to pass, or to block its passage, according to the switch fabric header in the cell. Part of the switching takes account of the different cell priorities which can be assigned to the cells, and cells of the different priorities are handled differently by ASICs. Thus, if there is provision for two different priority classes through each switch fabric, there may effectively be sixteen different paths between each pair of slot controllers. Each of these paths has to be checked for availability. In order to understand how this is done, it is necessary first to explain the operation of the health check system.

In the health check system of the invention, the slot controllers continually check the paths to each other slot controller using health check request cells. These health check request cells are special cells generated and checked by health check control means in the slot controllers to verify the availability of the data paths through the switch fabrics.

Figure 5:
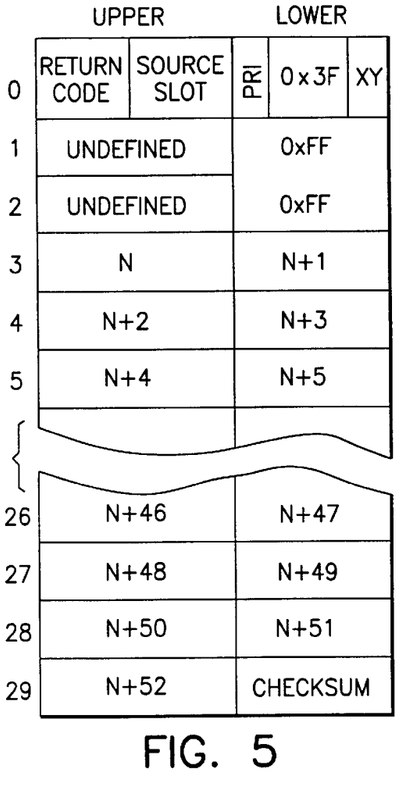
FIG. 5 shows a preferred structure of a health check request cell which can be transmitted through the switch fabric to determine data path availability according to the invention.

The preferred structure of health check request cell is illustrated in FIG. 5. The low byte of the first word contains six bits of link code with the most significant bit being the priority bit and the least significant bit being the xy bit. The xy bit selects to which cell processor (CCx or CCy) the cell is to be routed. If it is set to 0, the cell goes to the CCx processor, and if it is 1, the cell goes to the CCy processor. The link code used for health check request cells is 0×3 f ("0x" signifies a hexadecimal value). The upper byte of the first word (0) is used to contain the source slot controller number (0×00–0×31) in the lower nibble and the return codes in the upper nibble. Valid return codes are:

0×0. This means that the response cell should be returned using the SFA port and routed to the CCx processor.

0×1. This means that the response cell should be returned using the SFA port and routed to the CCy processor.

0×2. This means that the response cell should be returned using the SFB port and routed to the CCx processor.

0×3. This means that the response cell should be returned using the SFB port and routed to the CCy processor.

A health check request cell has all bits of the Slot Controller Destination (lower byte of word 1) set to 1 to cause the cell to be broadcast to all slots. Co-owned U.S. Pat. No. 5,436,893 to Barnett which is hereby incorporated by reference herein in its entirety discloses a system of multicast distribution of ATM cells within an ATM Cell Switch, and this system is preferably employed in the switch of the invention. The next fifty-three bytes of the health check cell consist of an incrementing sequence of bytes, based on a pseudorandom seed, to provide a payload for the cell. The actual values are not important to the functioning of the health check cell, the load merely serving to make the cell physically the same as normal payload cells. The last byte in the cell is an internal cell checksum to prove data integrity; an error in the checksum indicating the possibility of a fault short of failure in the path over which the cell had travelled.

Figure 6:
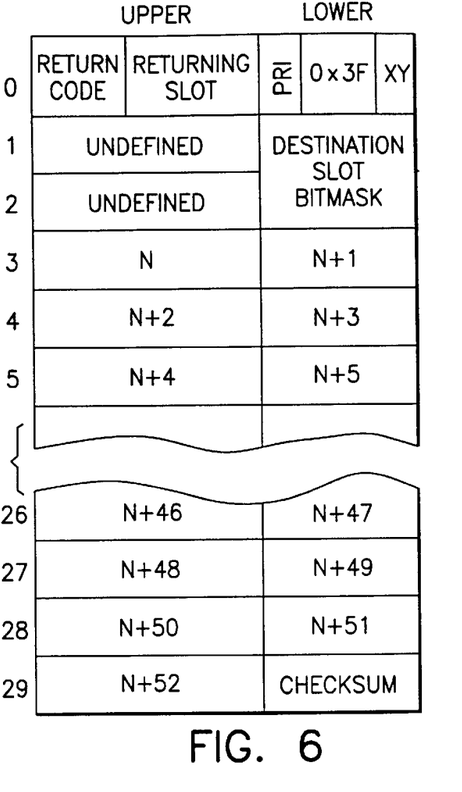
FIG. 6 shows a preferred structure of health check response cell returned by a slot controller in response to receipt of the request cell illustrated in FIG. 5.

At the receiving slot controller, the health check control means generates a health check response cell in response to receipt of each health check request cell, and sends this back to the originating slot controller, and cell processor within it, over the same data path as the request cell to which it is responding. The structure of the response cell is illustrated in FIG. 6. The lower byte of the first word (word 0) contains the special health check response cell link code (0×3 in hexadecimal) with the priority bit in the most significant bit and the xy bit in the least significant bit. The upper byte of the first word contains the slot number of the slot controller sending the response cell in the lower nibble and the return codes (copied from the request cell) in the upper middle.

The lower bytes of the second and third words (1 and 2) contain the destination slot bit mask. The appropriate bit within this word is set so that the cell is routed to the sending slot of the request cell that caused the generation of the response cell (the sender's slot number was obtained from the upper byte of the first word of the health check request). The remainder of the cell is a separate incrementing sequence of bytes, the internal checksum being recalculated to reflect the new header contents.

Figure 7:
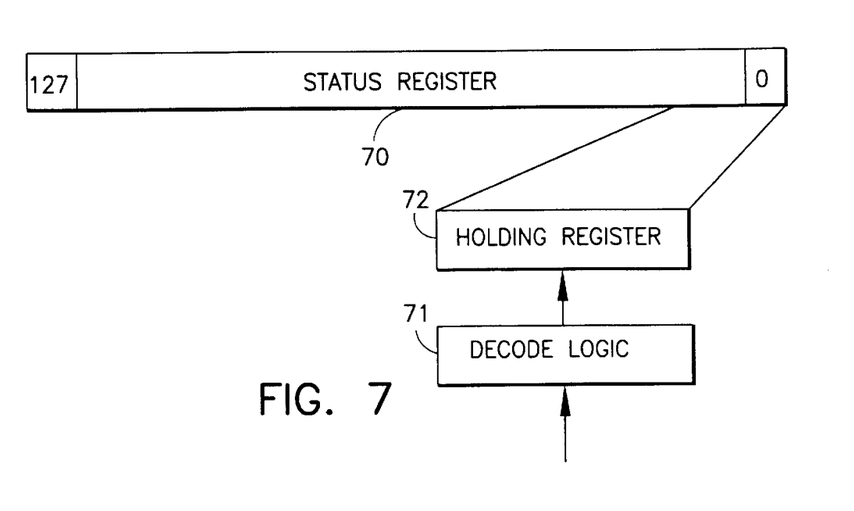
FIG. 7 shows the logic within the slot controller handling the path status checking and recording.

The path status checking and recording logic is illustrated by FIG. 7. A one hundred twenty-eight bit path status register 70 stores the availability of each path in the switch, in terms of "good" or "bad", represented by 1 or 0. Each slot controller send a health check cell not only to each of the other fifteen slot controllers, but also to itself. Thus, the one hundred twenty-eight bits are made up of sixteen slot controllers times two cell processors per slot controller times two levels of priority times two switch fabrics. (The two levels of priority referred to are those by which the switch fabric itself operates. The ASIC elements within the switch fabric which perform the switching operation are programmed for convenience to operate with two priority levels. This is an arbitrary arrangement which is not essential to the operation of the invention.) A decode logic 71 receives the response cells and generates an address in a holding register 72 and generates the response bit to be stored therein. the holding register is a sixteen bit register which stores the results of one set of tests for the sixteen slot controllers and then transfers these results to the appropriate sixteen bit region of the path status register 70, in readiness for the next set of tests. As explained in more detail hereinafter with reference to FIG. 8, before the contents of the holding register are transferred to the appropriate region of the path status register, they are compared with the existing contents to determine whether any paths previously available are now indicated as unavailable. If a change in this way is detected (the opposite changes are not considered—a path is treated as available until the tests indicate otherwise), the set of tests is repeated once and the results transferred to the path status register, regardless of the results.

Figure 8:
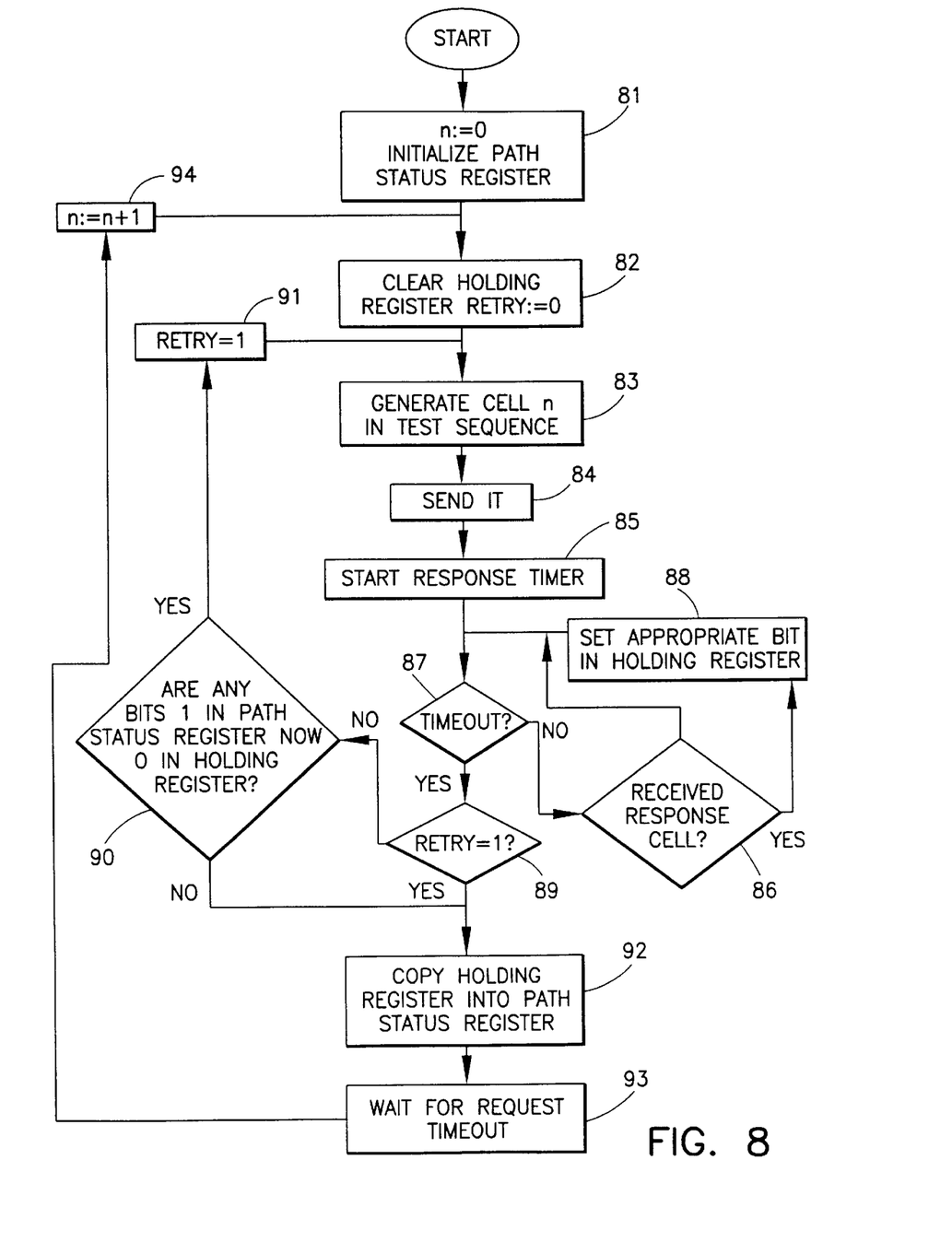
FIG. 8 is a flow diagram illustrating the operation of the health check algorithm of the invention.

FIG. 8 illustrates the algorithm by which the health check is carried out. The first step (81) is to clear the path status register to all 0s (all bad), or all 1s (all good), and the value of n is set to 0. In the next step (82), the holding register is cleared, and the value of the Retry flag is set to 0. A priority 0 health check request cell as hereinbefore describe is built at step (83), and this cell is sent (84) over the appropriate interface according to the destination and switch fabric codes included in it. The response timer is started (85), and if a valid response cell (i.e., one which has a valid checksum) is received (86) before the end of the timeout period (87), the appropriate bit is set by the decode logic 71 (FIG. 7) in the holding register 72 (at 88). If the end of the timeout period is reached without receipt of a response cell, or if the response cell is received, and the retry flag is still 0 (89), a comparison between the content of the holding register 72 and the corresponding region of the path status register 70 is carried out (at 90), and if a change is detected, the retry flag is set to 1 (91), and the process is returned to step 83 to repeat the test. If there is no change, the holding register is copies (92) to the relevant region of the path status register 70, and the algorithm then waits (93) for the health check poll period to expire before incrementing n (94) and returning to step 82.

If at the end of the timeout test at step 87 the retry flag value is 1, the comparison between the contents of the holding register and those of the relevant region of the path status register is not carried out, and the process proceeds immediately to step 92.

The algorithm continues until the full set of path tests has been carried out, before starting again. The result is that each slot controller maintains a path status register that contains the availability of the paths to each of the other slot controllers.

In the preferred embodiment of the invention, the loss of a single health check request/response cell does not cause the path to go bad due to the retry process. Two in a row must fail before a path is marked as down although, in the preferred embodiment, only a single good cycle is enough to make the path available again.

Figure 9:
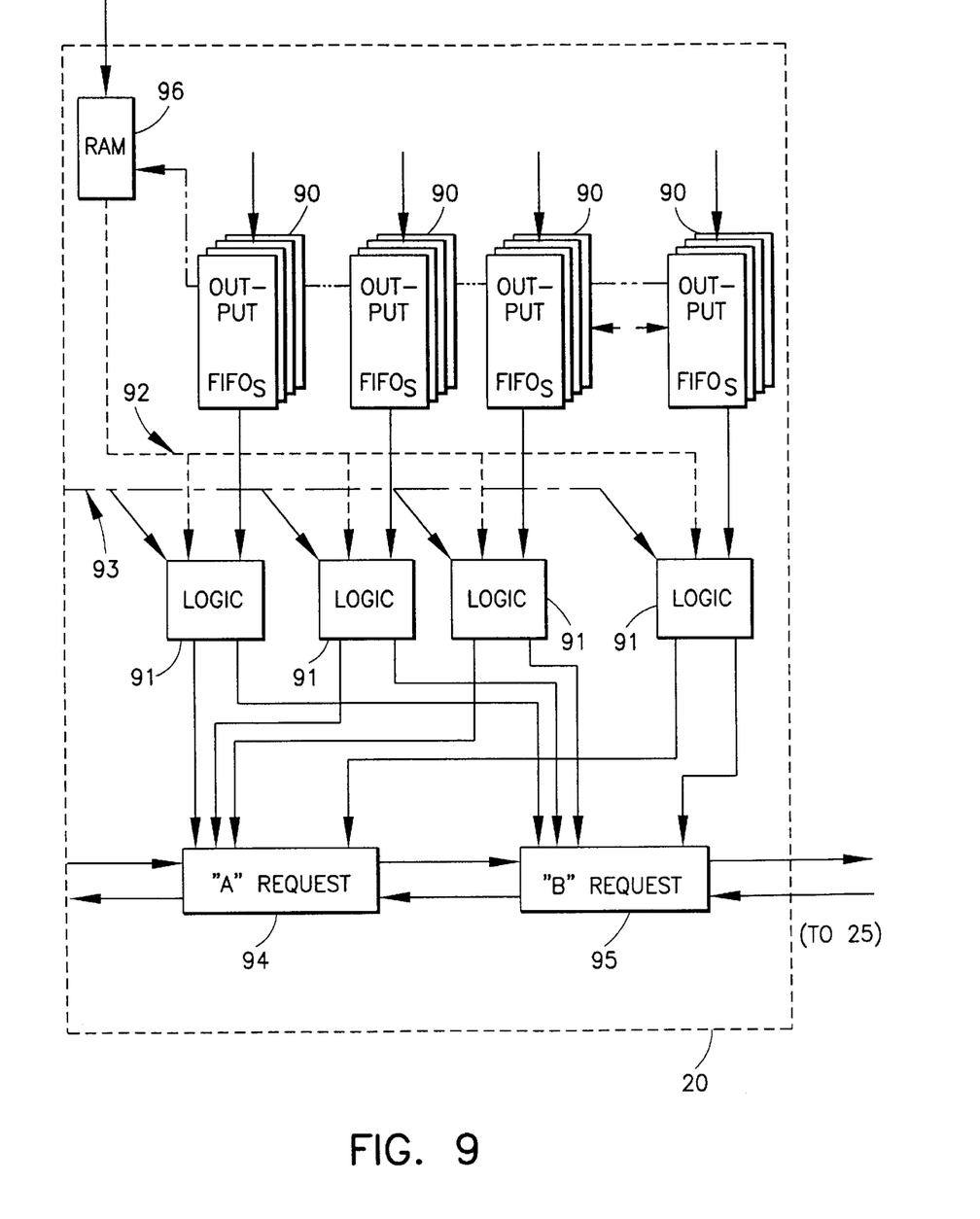
FIG. 9 is a diagram illustrating the logic within the slot controller controlling the selection of the output to one or other of the switch fabrics.

FIG. 9 shows the request mechanism within one of the two cell processors 20a and 20b in FIG. 2 by which the requests to the arbitration mechanism 25 are generated. Only one such mechanism is illustrated for convenience, but each cell processor 20 will incorporate such a mechanism. The cell processor 20 comprises a plurality of sets of output FIFOs 90, one set for each of the other slot controller destinations in the switch, and each set consisting of the four FIFOs, one for each of the cell priorities provided for by the switch. (It will be appreciated that fewer or more priorities can be accommodated by varying the number of FIFOs in each set 90.) The four priorities are treated as two higher and two lower priorities, thus giving simply two levels to be considered. Each FIFO within a set has a preference bit (for switch fabric A or switch fabric B) pre-set in RAM 96 in the cell processor 20 which can be changed according to the switch set-up. Each FIFO set 90 provides to the RAM 96 a one-bit non-empty request signal if it contains any ATM cells to be sent and this is signalled to a respective logic element 91, along with the respective preference bit, on signal line 92. A signal on line 93 from the health check mechanism provides the status of the path through the two switch fabrics, indicating whether the path is good or not (i.e. available or not). The logic elements 91, shown separately for the sake of clarity of explanation in FIG. 9, are in practice suitably carried out as logic functions by a microprocessor forming part of the control ASIC in the cell processor.

Each logic element 91 has two output request lines, one to an "A request" element 94 and one to a "B request" element 95. If a logic element 91 receives a request signal from its respective FIFO set 90 indicating that a cell is waiting to be sent to the switch fabric, it generates a request according to the following:

If both SF paths are good the request is for the preference;

If the preference path is good and the other path is bad, the request is for the preference;

If the preference path is bad and the other path is good, the request is for the other path; and If both paths are bad, requests are generated for both paths, resulting in cells being transmitted and, in consequence of the path failure, lost or discarded. This is necessary because cells must be emptied from the FIFO as soon as possible to avoid congestion upstream of the cell processor.

The A and B request elements 94 and 95 then determine which is the highest priority cell waiting to be sent at any instant and generate and external request to the arbitration logic 25, to be handled as hereinbefore described. When the arbitration logic 25 signals to the cell processor to send its cell, the request elements between them signal to the appropriate FIFO 90 to send its next cell to the switch fabric determined by the logic element 91.

There have been described and illustrated herein a fault tolerant data network switch. While particular embodiments of the invention have been described, it is not intended that the invention be limited thereto, as it is intended that the invention be as broad in scope as the art will allow and that the specification be read likewise. Thus, while specific preferred health check cell formats and a health check algorithm were provided, it will be appreciated that the health check cells could take other formats, and other algorithms could be provided. Likewise, while particularly preferred processor apparatus disclosed in co-owned applications was described, it will be appreciated that other processor apparatus could be utilized in accord with the principles of the invention. Also, while the invention was described with specific reference to two separate switch fabrics, it will be appreciated that three or more separate switch fabrics could be utilized. It will therefore be appreciated by those skilled in the art that yet other modifications could be made to the provided invention without deviating from its spirit and scope as so claimed.

I claim:

1. An ATM data network switch, comprising:

a) two separate switch fabrics, with both of said two separate switch fabrics being active at the same time;

b) a plurality of slot controllers, each slot controller having at least one external data link thereto and being separately connected to each of said two separate switch fabrics, wherein each switch fabric comprising means for switching a data cell transmitted from any one of said plurality of slot controllers to any other of said plurality of slot controllers, and each of said plurality of slot controller comprises (i) means for determining the availability of data paths to all others of said plurality of slot controllers through both said two separate switch fabrics, (ii) means for storing an indicator of the availability of each of the data paths from and to the said slot controller, said means for storing being coupled to said means for determining and (iii) means for selecting, for each cell to be switched, a data path through one or other of two separate switch fabrics and for sending the cell via said data path according to the availability determined by said means for determining and stored in said means for storing, said means for selecting being coupled to said means for storing.

2. An ATM data switch according to claim 1, wherein:

at least one of said plurality of slot controllers comprises two or more cell processors each connected to at least one external data link, and means for connecting each of the cell processors to each of said two separate switch fabrics.

3. An ATM data switch according to claim 2, wherein:

each of said plurality of slot controllers comprises means for periodically sending to each other of said plurality of slot controller via each of said two separate switch fabrics a "health check" data cell, means for receiving health check cells from others of said plurality of slot controllers and for generating a response cell for each received cell to indicate receipt by that slot controller, means for sending each response cell to the source of the received cell via the same data path over which the health check cell was received, and means for monitoring the receipt of health check response cells from other slot controllers and for identifying therefrom the availability of individual data paths through each of said two separate switch fabrics.

4. An ATM data switch according to claim 3, wherein:

said means for monitoring comprises means for checking if a returned cell is not received over a previously available path within a predetermined time after sending of an original health check cell, and for initiating transmission of a further health check cell over said data path, and means for changing said indicator of the availability for said previously available path if a response to said further health check cell is not received within a further predetermined period.

5. An ATM data switch according to claim 4, wherein:

said means for changing said indicator of the availability changes said indicator of the availability when a response to a health check cell is received over a previously unavailable path.

6. An ATM data switch according to claim 5, wherein:

said means for periodically sending comprises means for generating said health check request cell comprising a code indicating the source of said health check request cell, and means for broadcasting said health check request cell on all the data paths from the slot controller sending said health check request cell to all other slot controllers in said ATM data switch.

7. An ATM data switch according to claim 3, wherein:

said means for periodically sending comprises means for generating said health check request cell comprising a code indicating the source of said health check request cell, and means for broadcasting said health check request cell on all the data paths from the slot controller sending said health check request cell to all other slot controllers in said ATM data switch.

8. An ATM data switch according to claim 1, wherein:

each of said plurality of slot controllers comprises means for periodically sending to each other of said plurality of slot controller via each of said two separate switch fabrics a "health check" data cell, means for receiving health check cells from others of said plurality of slot controllers and for generating a response cell for each received cell to indicate receipt by that slot controller, means for sending each response cell to the source of the received cell via the same data path over which the health check cell was received, and means for monitoring the receipt of health check response cells from other slot controllers and for identifying therefrom the availability of individual data paths through each of said two separate switch fabrics.

9. An ATM data switch according to claim 8, wherein:

said means for monitoring comprises means for checking if a returned cell is not received over a previously available path within a predetermined time after sending of an original health check cell, and for initiating transmission of a further health check cell over said data path, and means for changing said indicator of the availability for said previously available path if a response to said further health check cell is not received within a further predetermined period.

10. An ATM data switch according to claim 9, wherein:

said means for changing said indicator of the availability changes said indicator of the availability when a response to a health check cell is received over a previously unavailable path.

11. An ATM data switch according to claim 10, wherein:

said means for periodically sending comprises means for generating said health check request cell comprising a code indicating the source of said health check request cell, and means for broadcasting said health check request cell on all the data paths from the slot controller sending said health check request cell to all other slot controllers in said ATM data switch.

12. An ATM data switch according to claim 10, wherein:

said means for selecting for each cell to be switched a data pat comprises means for reading a cell priority bit in the header of each cell and means for selecting the data path according to the value of the cell priority bit, if more than one data path is available.

13. An ATM data switch according to claim 8, wherein:

said means for periodically sending comprises means for generating said health check request cell comprising a code indicating the source of said health check request cell, and means for broadcasting said health check request cell on all the data paths from the slot controller sending said health check request cell to all other slot controllers in said ATM data switch.

14. An ATM data switch according to claim 8, wherein:

said means for selecting for each cell to be switched a data path comprises means for reading a cell priority bit in the header of each cell and means for selecting the data path according to the value of the cell priority bit, if more than one data path is available.

15. An ATM data switch according to claim 1, wherein:

each of said two separate switch fabrics comprises a multiple crosspoint switch.

16. An ATM data switch according to claim 1, wherein:

said means for selecting for each cell to be switched a data path comprises means for reading a cell priority bit in the header of each cell and means for selecting the data path according to the value of the cell priority bit, if more than one data path is available.

17. An ATM data network switch according to claim 1, wherein:

said means for selecting a data path and for sending the cell via said data path selects said data path through one or other but not both of said two separate switch fabrics for each cell.

18. An ATM data network switch according to claim 17, wherein:

at least one of said plurality of slot controllers sends first cells over a first data path through a first of said two separate switch fabrics, and sends second cells over a second data path through a second of said two separate switch fabrics.

19. An ATM data network switch according to claim 1, wherein:

each of said two separate switch fabrics is substantially identical to the other and is adapted to accommodate a predetermined data throughput per slot controller, and each of said plurality of slot controllers includes means for sending data at a rate exceeding said predetermined data throughput by sending cells through both said separate switch fabrics simultaneously.

20. A method of switching cells of ATM data through an ATM data network switch, comprising:

a) providing two separate switch fabrics;

b) providing a plurality of processors, each processor coupled to each of said two separate switch fabrics;

c) periodically sending from each of said plurality of processors to all others of said plurality of processors a "health check" cell;

d) receiving at each of said plurality of processors the health check cells of the other processors and generating and sending a response cell for each received health check cell to indicate receipt;

e) receiving at each of said plurality of processors the response cells, and identifying therefrom the availability of data paths through each of said two separate switch fabrics;

f) storing indicators of said availability;

g) sending data cells from a first of said plurality of processors via a plurality of particular data paths through a first of said switch fabrics, unless said indicator for any of said plurality of particular data paths indicates that said particular data path is unavailable, and in that case, sending said at least some of said data cells from said first of said plurality of processors via another data path through a second of said switch fabrics while continuing to send others of said cells along available data paths through said first of said switch fabrics.

* * * * *